June 29, 1965  J. S. LADENDORF  3,191,463
SOLID BORING APPARATUS
Filed July 25, 1962  3 Sheets-Sheet 1

INVENTOR.
JACK S. LADENDORF
BY
Barnes, Kisselle, Raisch & Choate
ATTORNEYS

June 29, 1965     J. S. LADENDORF     3,191,463
SOLID BORING APPARATUS

Filed July 25, 1962                3 Sheets-Sheet 2

INVENTOR.
JACK S. LADENDORF
BY
Barnes, Kisselle, Raisch & Choate
ATTORNEYS

June 29, 1965  J. S. LADENDORF  3,191,463
SOLID BORING APPARATUS
Filed July 25, 1962  3 Sheets-Sheet 3
Fig. 10
Fig. 11
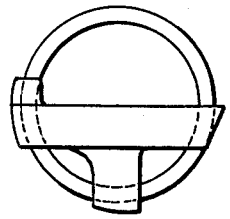
Fig. 12
Fig. 14
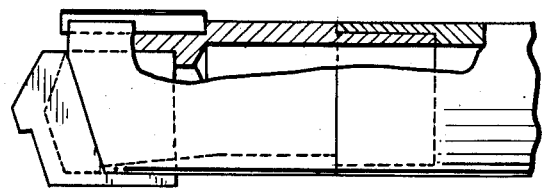
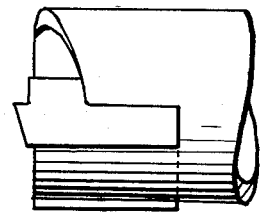
Fig. 13
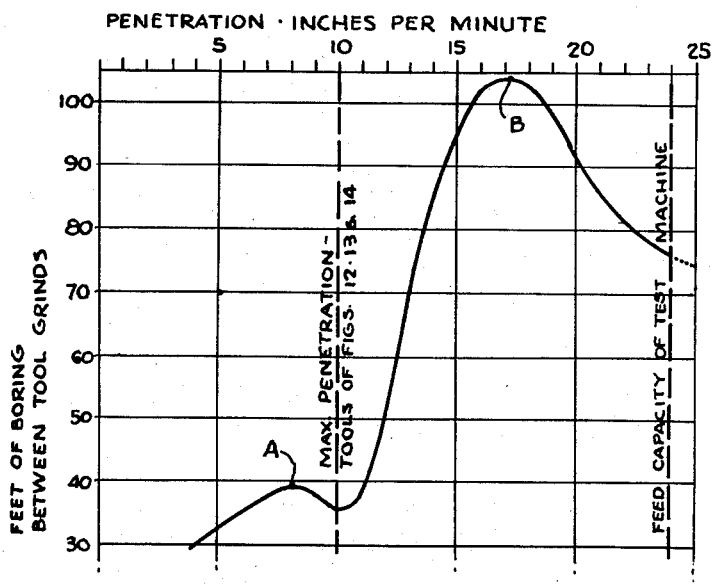
Fig. 15
INVENTOR.
JACK S. LADENDORF
BY
Barnes, Kisselle, Raisch & Choate
ATTORNEYS

United States Patent Office 3,191,463
Patented June 29, 1965

3,191,463
SOLID BORING APPARATUS
Jack S. Ladendorf, Detroit, Mich., assignor to American Heller Corporation, Detroit, Mich., a corporation of Michigan
Filed July 25, 1962, Ser. No. 212,229
14 Claims. (Cl. 77—58)

This invention relates to the producing of holes in workpieces and particularly to solid boring apparatus wherein a solid boring tool is brought into engagement with the workpiece, relative rotation is produced between the boring tool and the workpiece, and liquid coolant is caused to flow externally of the boring tool and back through said boring tool carrying with it the chips from the cutting operation.

In the German patent to Beisner 848,140 dated Sept. 1, 1952, there is disclosed a method of making holes in workpieces by bringing a boring tool head with a cutter thereon into engagement with a workpiece and providing relative rotation between the workpiece and the head. According to the disclosure of Beisner, coolant is provided externally to the boring tool head and passes back through an axial opening in the head carrying with it the chips. The head is mounted on a hollow boring bar by threading.

In the making of small holes, the mounting of the boring head on the boring bar by threading has been found to be impractical. Moreover, the mounting of the boring head on the boring bar by brazing the Beisner head in position has been found to produce a construction which is torsionally weak both from the standpoint of the brazed junction between the tool head and the boring bar and the brazing strains which occur between the body and the cutter causing strain cracks in the carbide cutter.

In the United States patent to Kleine 2,969,699, there is disclosed an arrangement wherein a T-shaped carbide cutter is mounted on a solid boring bar by brazing, one arm of the cutter forming the cutting edge and the other two arms of the cutter forming the pressure pads. Although such a construction has been found suitable for boring, the conditions under which the construction must be operated in order to prevent shock on the tool have been found to be critical necessitating operation of the boring machine in such a manner as to keep a constant control of the feed power to prevent the feed power from exceeding the torsional strength of the brazed T-shaped cutter. The feed power increases directly with the dullness of the cutting edge. Also, if there is any tendency of the material being cut to generate long chips, a danger exists that the chip mouth will clog with resultant destruction of the carbide tip and thus the tool itself.

It is an object of this invention to provide a solid boring apparatus which can be used for producing both small and large diameter holes; which will bore holes efficiently and accurately; which is stronger, more resistant to chip abrasion, and can be operated at greater penetration rates than apparatus presently being used; which includes a boring head that can be mounted on the boring bar by brazing or by threads without detrimental effects on the strength thereof.

Basically, the solid boring apparatus comprises a solid boring head which is particularly constructed as to minimize the adverse effects obtained by brazing the cutter to the head and which is made into the final shape for receipt of the cutter and pressure pads by investment casting. As hereinafter more fully described, the resultant boring apparatus is stronger, more efficient, more resistant to chip abrasion, and can be operated at better penetration rates than has been heretofore possible.

In the drawings:

FIG. 10 is a view of the solid boring head embodying the invention showing diagrammatically the manner in which the material flow lines occur.

FIG. 11 is a view similar to FIG. 10 of a solid boring head of identical mechanical design but made by machining.

FIG. 12 is an end view of a prior art solid boring tool.

FIG. 13 is a side view of the tool shown in FIG. 12.

FIG. 14 is a fragmentary, part sectional view of a solid boring tool of different construction.

FIG. 15 is a graph of test results comparing the solid boring tools embodying the invention with the tools shown in FIGS. 12-14.

Figure 1:
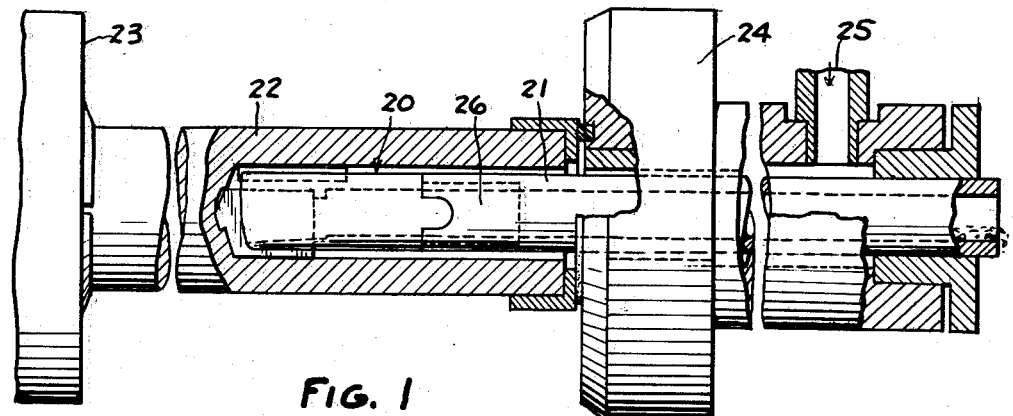
FIG. 1 is a part sectional view of a solid boring apparatus embodying the invention.
Figures 2, 3, 5:
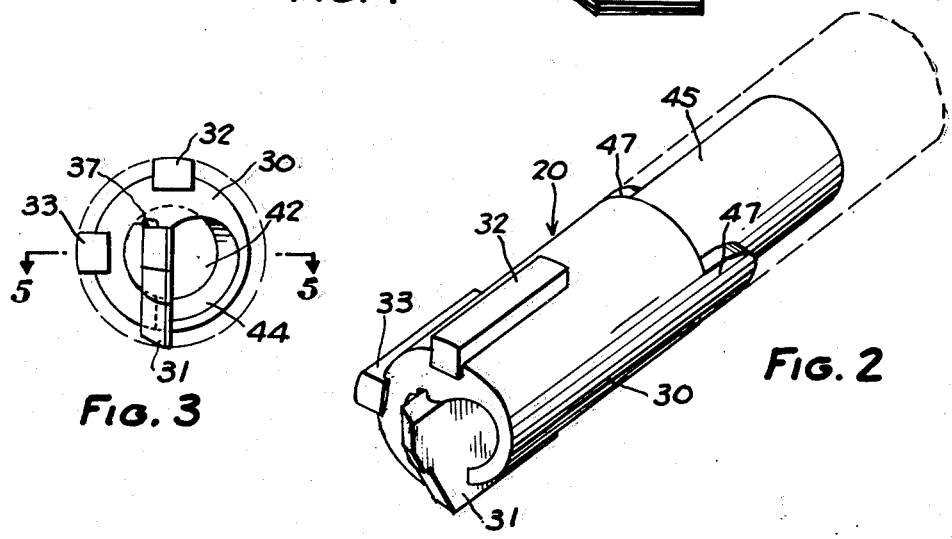
FIG. 2 is a perspective view of the solid boring head used in the apparatus shown in FIG. 1.
FIG. 3 is an end view of the head shown in FIG. 1.
FIG. 5 is a sectional view taken along the line 5—5 in FIG. 3.

Referring to FIG. 1, basically the solid boring apparatus embodying the invention comprises a solid boring head 20 mounted on a hollow boring bar 21 mounted in a support 24 and adapted to be moved axially into engagement with a workpiece 22 that is rotated by a suitable power source 23. As is well known in the art, liquid coolant is provided through an inlet 25 in support 24 externally along the boring bar 21 and head 20 and then axially through a passage 26 in the boring head and boring bar carrying with it the chips that are removed by the cutter on the boring head 20.

As shown in FIGS. 2-5, the boring head 20 comprises a one-piece body 30 which is made by investment casting in the final shape for receipt of a hardened cutter 31 and hardened bearing pads 32, 33 in cavities 32a, 33a, made, for example, of tungsten carbide, which are brazed to the body 30. The boring head body 30 includes a radial slot 34 which extends axially through one end of the body 30 and radially through one portion of the periphery thereof to define a flat bearing surface 35 to which the cutter 31 is brazed, preferably by use of a silver coated copper shim. The body 30 includes a generaly rectangular axial surface 36 which is at a right angle to the surface 35 and against which the side edge 37 of the cutter 31 abuts. The boring head body 30 includes a second locating surface 38 defined by spaced portions 38a, 38b extending radially at the bottom of the slot 34 and against which the end edge 39 of cutter 31 abuts. In order to avoid strains caused by brazing material entering between the surfaces 36, 37 and 38, 39, an axial recess 40 and a radial recess 41 are provided in the body 30. Axial recess 40 is at the area of juncture of the transverse surface 35 and the first locating surface 36. Radial recess 41 is provided at the area of juncture of the transverse axial surface 35 and the second locating surface 38.

Figure 4:
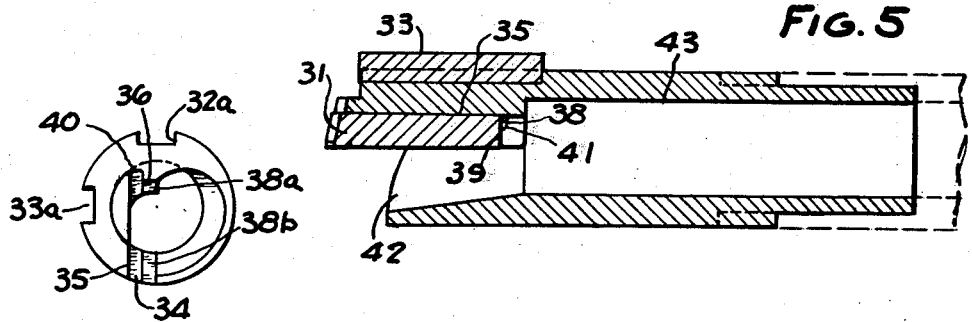
FIG. 4 is a view similar to FIG. 3 with the carbide cutter and carbide bearing pads removed.

The boring head body 30 is also formed with an axial chip opening 42 which communicates with a hollow axial opening 43 extending entirely through the boring head body 30. The end 44 of the cutter body 30 is tapered to provide clearance for the chips. As shown in FIG. 4, the chip opening 42 provides the locating surface 38 into spaced portions 38a, 38b.

As further shown in FIGS. 2, 5, 7 and 8, the other end of the boring head body 30 is reduced in cross section as at 45 and telescopes into the opening 46 in the boring bar 21. The boring head body 30 is formed with diametrically opposed integral lobes 47 which extend into complementary slots 48 in the boring bar 21 to assist in absorption of the torsional force. The boring head body 30 is fixed to the boring bar 21 by brazing along surfaces 45, 46.

As heretofore stated, the cutter body 30 together with all the indentations, recesses and the like is formed by investment casting to the final shape. The investment casting process used is conventional and comprises utilizing wax or plastic patterns that are embedded in a mold of suitable refractory material for ferrous alloys by pouring the mold material around the pattern and heating the mold material to dry the mold material and melt the wax or plastic patterns out of the mold. Molten metal is then introduced into the resultant cavities while the mold is hot. The metal is preferably vacuum melted at temperatures on the order of 1540–1590° C. and the mold is preferably at temperatures on the order of 1010–1040° C. After the metal is cooled, the mold material is broken away from the castings that have been formed.

It has heretofore been thought that articles made by investment casting have lesser strength than articles made by machining from wrought or rolled material. I have found, on the contrary, that boring heads made by investment casting are stronger and more resistant to torsion than identical boring heads made by machining wrought or rolled alloys. Although I do not wish to be bound by the theory involved, in my opinion, the stronger results are due to the fact that in the case of machined boring heads, the machining necessary to produce the intricate pattern required shown in FIGS. 2–8 reduces and removes the skin portions whereas in the cutter head made by investment casting, the cast pattern is such that the matrix at the surface of the cutter head is left undisturbed. Thus, for example, referring to FIG. 10 which is a solidification pattern of a cutter head made by investment casting and FIG. 11 which is a solidification pattern of a machined wrought cutter head, it can be seen that the machining necessarily removes material and disturbs the flow lines whereas the final shape of the investment casting leaves the flow lines intact. More specifically, it is believed that the investment casting technique results in an iron carbon matrix at the skin portion of the cutter head producing a high carbon steel at the surface which is particularly desirable in providing proper chip abrasion at the mouth area of the tool. Additionally, the absence of the alloying elements in the skin section is desirable for brazing. At the same time, the alloys are in the core material to increase toughness of the metal structure. This results in a stronger overall construction than the machined cutter head such as shown in FIG. 11.

Although various materials can be used as will occur to a person skilled in the art, I have found that cutter heads made of the following percentage compositions by weight produce satisfactory results:

| | | |
|---|---|---|
| Carbon | 0.50–0.60% | 0.50–0.60%. |
| Manganese | 0.60–0.90% | 0.60–0.90%. |
| Silicon | 1.80–2.20% | 1.80–2.20%. |
| Chromium | 0.30% max. | 0.30% max. |
| Molybdenum | | 0.30–0.50%. |
| Vanadium | 0.30% max. | 0.30% max. |
| Iron | Balance | Balance. |

Particularly satisfactory results are obtained by using an alloy of the following percentage composition by weight:

| | Percent |
|---|---|
| Carbon | .46–.51 |
| Manganese | .87–.91 |
| Silicon | 2.00–2.20 |
| Chromium | .20–.30 |
| Vanadium | .15–.25 |
| Phosphorus | .025 max. |
| Sulfur | .025 max. |
| Iron | balance |

Average skin hardness—57 Rockwell "C" (measured by Shore Scleroscope and converted to Rockwell).

Boring heads made in accordance with the invention have been found to be particularly satisfactory in apparatus for making small holes on the order of less than ¾ of an inch since the boring heads can be readily brazed to a boring bar. However, the boring heads may be cast with the threads in situ to produce a boring head that can be threaded to a boring bar for the larger sizes.

Figure 6:
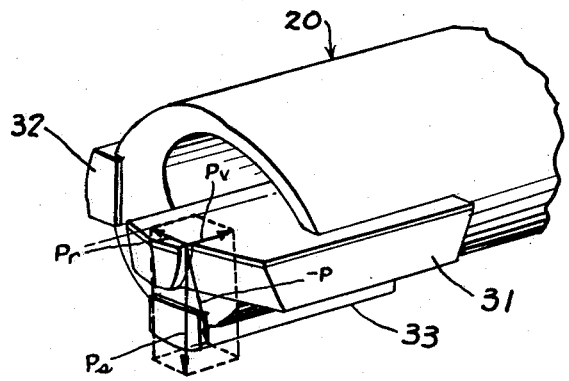
FIG. 6 is a perspective view similar to FIG. 2 showing the forces on the carbide head during boring.
Figure 7:
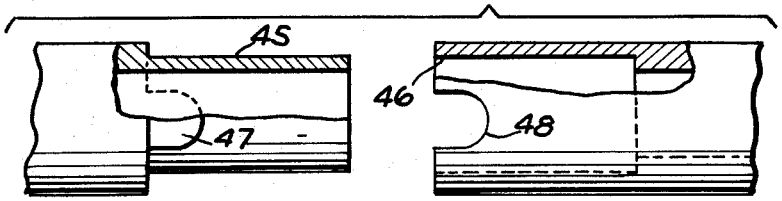
FIG. 7 is a fragmentary, part sectional, exploded side view showing the manner in which the solid boring head is mounted on a boring bar.
Figure 8:
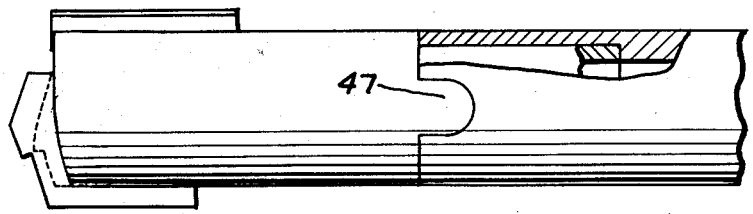
FIG. 8 is a view similar to FIG. 7 showing the solid boring head mounted on the boring bar.
Figure 9:
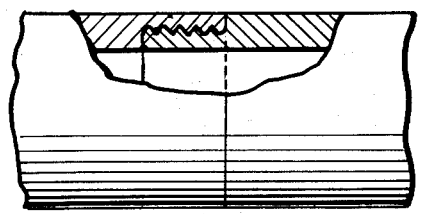
FIG. 9 is a part sectional side view of a modified mounting of the solid boring head on the boring bar.

FIG. 6 represents the forces of boring on the solid boring head embodying the invention. As shown, the forces comprise the main cutting force vector $\overline{P_s}$, the radial force vector $\overline{P_r}$ and a feed force vector $\overline{P_v}$. These three forces produce a resultant force vector $\overline{P_{res}}$. In order to perform the function of solid boring, the carbide cutter 31 must have a minimum width W which is greater than the radius of the tool itself in order to insure removal of material up to the center line of the bore. The thickness of the cutter 31 and the guide or bearing pads 32, 33 must be sufficient to absorb the aforementioned forces of solid boring. Finally, the sections of metal at any point must be sufficient to absorb the forces on the head itself.

Thus, for example, when a boring head of 1⅛ inches diameter made by investment casting in accordance with the structure shown in FIGS. 2–5 was tested and compared with a similar head made by precision machining from a rolled steel body, it was found that at normal and elevated penetration rates, the cutter body made by investment casting could be operated at approximately 28 percent higher penetration rates before the carbide cutter broke. It can be appreciated that the machined cutter body was made carefully with the specific design shown in FIGS. 2–5 although the production of recesses and the like is not commercially practical by machine methods. In the making of the test, both the investment cast body and the machined body were threaded to the boring bar. The boring body made by investment casting only failed at the carbide cutter so that the head could be brought back to operating condition with re-tipping with a new carbide cutter. However, the machined boring body failed not only in breaking of the carbide cutter but in shearing in advance of the threads.

Further tests were made by comparing a boring bar having a T-blade such as shown in the aforementioned Kleine patent. As shown in FIGS. 12 and 13, prototype tools made in accordance with the Beisner patent but brazed instead of threaded into a boring bar, as shown in FIG. 14, and a boring head embodying the invention. The results of these tests are shown in FIG. 15 which is a curve of the number of workpieces (each 12 inches long) or feet of boring between tool grinds versus the optimum penetration rates. The results of these tests were not only significant to the art of producing holes, but they revealed the presence of more than one optimum penetration rate, as will be presently discussed. The normal optimum rate "Point A" on the graph in FIG. 15 was obtained at about 8 inches per minute, giving an average of 43–44 pieces per grind (feet of boring), approached the limit of strength of the tools constructed according to the art shown in FIGS. 12, 13 and 14. As the tool became dull through boring, greater thrust loads ($\overline{P_v}$) are required, which give the following adjustment of boring forces:

As the feed forces or feed thrust ($\overline{P_v}$) increases, we find a proportionate increase to $\overline{P_r}$ and $\overline{P_s}$ and accordingly the resultant force $\overline{P_{res}}$ is increased. As $\overline{P_s}$ increases, the torque applied to the tool cutter, tool head and boring bar or shank is likewise increased.

If the tools shown in FIGS. 12, 13 and 14 were allowed to bore workpieces too much in excess of 43 to 44 pieces, the danger of destroying completely the cutter and/or causing a complete separation of the tool head and bar increased. Similarly, if the penetration rate exceeded approximately 10 inches per minute, destruction of the tool resulted.

In the case of the tool head construction covered by the present invention and depicted in FIGS. 2–5 produced as an investment casting, the tool strength was more than sufficient to not only allow a substantial increase to $\overline{P_v}$ through increasing penetration rate, but a second optimum was noted for tool life and a firm indication of a third optimum was observed. The complete definition of the third optimum was not possible as available test equipment was not capable of providing penetration rates above 24 inches per minute. This new optimum (Point "B" of FIG. 15) of about 15.7 inches per minute allowed approximately 105 workpieces (105 feet of boring) per tool grind; this represents approximately 245% improvement to tool life performance, and approximately 50% savings in actual boring time.

The presence of more than one optimum penetration rate without an accompanying change in surface speed is believed to be significant. It has been shown, primarily by the carbide manufacturer, that more than one tool life optimum exists through changes in surface speed. In these latter tests showing several tool life optima, however, the chip load (feed per revolution) was kept relatively constant. However, as indicated by the test shown in FIG. 15, advancements in high penetration rates, as they affect tool life, are now possible through the improved tool construction and method of manufacture as pointed out in this patent application.

I claim:

1. In a solid boring apparatus wherein
    a boring tool head is brought into engagement with a workpiece and relative rotation is produced between the workpiece and the tool head,
    liquid coolant is applied externally and the chips are removed internally through the tool head,
    the combination comprising a solid boring head comprising a head body having a radial slot extending axially through the periphery in one end thereof,
    said slot defining a transverse axial surface,
    said body having an axial locating surface at an angle to said axial surface,
    said body having an axial recess at the juncture of said axial locating surface and said transverse axial surface,
    said body having a second locating surface extending radially at an angle to said transverse axial surface,
    said body having a radial recess at the juncture of said second locating surface and said transverse axial surface,
    said body having an axial chip opening through which the chips pass extending from said one end thereof adjacent said slot and defining a chip mouth at one end of said body,
    said body having axially extending cavities along the periphery thereof for receiving pressure pads,
    said body being made by investment casting in substantially final form,
    a pressure pad in each of said pressure pad openings,
    a cutter in said radial slot and having a flat surface brazed to said transverse axial surface,
    said cutter having a side edge engaging said first locating surface and an end edge engaging said second locating surface,
    a tubular boring bar,
    and means for mounting said boring head on said boring bar.

2. The combination set forth in claim 1 wherein said said means for mounting said boring head on said boring bar comprises a portion of reduced cross section on one of said boring head and boring bar,
    the other of said boring head and boring bar having a complementary opening therein,
    a projection extending radially outwardly from said portion of reduced cross section,
    and a complementary pocket in the other of said boring head and boring bar for receiving said projection,
    said boring head and boring bar being brazed together.

3. The combination set forth in claim 2 wherein said projection is cast in situ on said boring head and said pocket is provided on said boring bar.

4. The combination set forth in claim 1 wherein said means for mounting said boring head on said boring bar comprises threads cast in situ on said boring head and complementary threads on said boring bar into which the threads on said boring head are threaded.

5. The combination set forth in claim 1 wherein said boring head is made of a material having substantially the following percentage composition by weight:

| | Percent |
|---|---|
| Carbon | 0.50–0.60 |
| Manganese | 0.60–0.90 |
| Silicon | 1.80–2.20 |
| Chromium | 0.30 max. |
| Molybdenum | 0.30–0.50 |
| Vanadium | 0.30 max. |
| Iron | balance |

6. The combination set forth in claim 1 wherein said boring head is made of a material having the following composition:

| | Percent |
|---|---|
| Carbon | .46– .51 |
| Manganese | .87– .91 |
| Silicon | 2.00–2.20 |
| Chromium | .20– .30 |
| Vanadium | .15– .25 |
| Phosphorus | .025 max. |
| Sulfur | .025 max. |
| Iron | balance |

7. The combination set forth in claim 1 wherein said cutter has a surface thereof adjacent said axial chip opening which tapers radially outwardly away from said opening at said end edge thereof.

8. In a solid boring apparatus wherein
    a boring tool head is brought into engagement with a workpiece and relative rotation is produced between the workpiece and the tool head,
    liquid coolant is applied externally and the chips are removed internally through the tool head,
    the combination comprising a solid boring head comprising a head body having a radial slot extending axially through the periphery in one end thereof into which a cutter is adapted to be positioned.
    said slot defining a transverse axial surface,
    said body having an axial locating surface at an angle to said axial surface for engaging a side edge of said cutter,
    said body having an axial recess at the juncture of said axial locating surface and said transverse axial surface,
    said body having a second locating surface extending radially at an angle to said transverse axial surface for engaging a rear edge of said cutter,
    said body having a radial recess at the juncture of said second locating surface and said transverse axial surface,
    said body having an axial chip opening through which the chips pass extending from said one end thereof adjacent said slot and defining a chip mouth at one end of said body,
    said body having axially extending recesses along the periphery thereof for receiving pressure pads, said body being made by investment casting in substantially final form.

9. The combination set forth in claim 8 including a boring bar, and means for mounting said boring head to said boring bar comprising
    a portion of reduced cross section on one of said boring head and boring bar,
    the other of said boring head and boring bar having a complementary opening therein,
    projections extending radially outwardly from said portion of reduced cross section,
    and pockets in the other of said boring head and boring bar for receiving said projections,
    said boring head and boring bar being brazed together.

10. The combination set forth in claim 9 wherein said projections are cast in situ on said boring head and said pockets are in said boring bar.

11. The combination set forth in claim 8 including a boring bar, and means for mounting said boring head on said boring bar comprising threads cast in situ on said boring head and complementary threads on said boring bar into which the threads on said boring head are threaded.

12. The combination set forth in claim 8 wherein said boring head is made of a material having substantially the following percentage composition by weight:

| | Percent |
|---|---|
| Carbon | 0.50–0.60 |
| Manganese | 0.60–0.90 |
| Silicon | 1.80–2.20 |
| Chromium | 0.30 max. |
| Molybdenum | 0.30–0.50 |
| Vanadium | 0.30 max. |
| Iron | balance |

13. The combination set forth in claim 8 wherein said boring head is made of a material having the following percentage composition by weight:

| | Percent |
|---|---|
| Carbon | .46–.51 |
| Manganese | .87–.91 |
| Silicon | 2.00–2.20 |
| Chromium | .20–.30 |
| Vanadium | .15–.25 |
| Phosphorus | .025 max. |
| Sulfur | .025 max. |
| Iron | balance |

14. The combination set forth in claim 8 wherein said cutter has a surface thereof adjacent said axial chip opening which tapers radially outwardly away from said opening at said end edge thereof.

References Cited by the Examiner

UNITED STATES PATENTS

| 2,895,355 | 7/59 | Kline | 77—68 |
| 2,953,951 | 9/60 | Carlstedt | 77—68 |

FOREIGN PATENTS

| 848,140 | 9/52 | Germany. |
| 1,107,050 | 5/61 | Germany. |

OTHER REFERENCES

"American Machinist," June 3, 1948, "Carbide Drills," page 135.

WILLIAM W. DYER, Jr., *Primary Examiner.*

FRANK H. BRONAUGH, *Examiner.*